United States Patent
Horai et al.

(10) Patent No.: US 12,473,975 B2
(45) Date of Patent: Nov. 18, 2025

(54) WORK VEHICLE AND METHOD FOR CONTROLLING WORK VEHICLE

(71) Applicant: Kubota Corporation, Osaka (JP)

(72) Inventors: Kohei Horai, Sakai (JP); Yoshihiko Kuroshita, Sakai (JP); Michita Kono, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/675,440

(22) Filed: May 28, 2024

(65) Prior Publication Data

US 2024/0401695 A1    Dec. 5, 2024

(30) Foreign Application Priority Data

May 29, 2023   (JP) ................................ 2023-087626

(51) Int. Cl.
| | |
|---|---|
| *F16H 61/02* | (2006.01) |
| *B60K 35/22* | (2024.01) |
| *B60K 35/28* | (2024.01) |
| *F16H 61/68* | (2006.01) |
| *F16H 61/00* | (2006.01) |

(52) U.S. Cl.
CPC ......... *F16H 61/0248* (2013.01); *B60K 35/22* (2024.01); *B60K 35/28* (2024.01); *F16H 61/68* (2013.01); *B60K 2360/167* (2024.01); *F16H 2061/0087* (2013.01)

(58) Field of Classification Search
CPC ................ F16H 61/0248; F16H 61/68; F16H 2061/0087; B60K 35/28; B60K 35/22; B60K 2360/167
See application file for complete search history.

(56) References Cited

U.S. PATENT DOCUMENTS

2016/0033038 A1   2/2016   Kobayashi et al.

FOREIGN PATENT DOCUMENTS

| JP | 10-44814 A | 2/1998 | |
|---|---|---|---|
| JP | 2005-9532 A | 1/2005 | |
| JP | 2008-57674 A | 3/2008 | |
| JP | 2010019401 A | 1/2010 | |
| JP | 4769265 B2 * | 9/2011 | ........... A01C 11/003 |
| JP | 2012007657 A * | 1/2012 | |
| JP | 2016-35276 A | 3/2016 | |
| JP | 2019-6209 A | 1/2019 | |

* cited by examiner

*Primary Examiner* — Edwin A Young

(74) *Attorney, Agent, or Firm* — Keating & Bennett, LLP

(57) ABSTRACT

A work vehicle includes a transmission to shift gears by switching between main transmission gears and auxiliary transmission gears, an input interface for a user to set a value of the main transmission gear corresponding to at least one of the auxiliary transmission gears, a storage to store a correspondence between the auxiliary transmission gear and the value, and a controller configured or programmed to, when the auxiliary transmission gear is switched, set the main transmission gear to the value corresponding to the switched auxiliary transmission gear based on the correspondence.

9 Claims, 14 Drawing Sheets

PRIOR ART

PRIOR ART

WORK VEHICLE AND METHOD FOR CONTROLLING WORK VEHICLE

CROSS-REFERENCE TO RELATED APPLICATION

This application claims the benefit of priority to Japanese Patent Application No. 2023-087626, which was filed on May 29, 2023, the entire contents of which are hereby incorporated by reference.

BACKGROUND OF THE INVENTION

1. Field of the Invention

The present disclosure relates to work vehicles and methods for controlling work vehicles.

2. Description of the Related Art

Work vehicles, such as agricultural tractors, travel and work in various environments with different ground conditions. In order to be able to accommodate various conditions such as the ground conditions, the nature of the work, and the required vehicle speed, work vehicles are generally configured to be capable of shifting through multiple gears. The multi-speed gearshift can be realized by a combination of a main transmission and an auxiliary transmission. For example, if the number of gears of the auxiliary transmission is 3 and the number of gears of the main transmission is 8, it is possible to shift through a total of 24 gears. The main transmission gear and the auxiliary transmission gear can be switched by the user operating the corresponding controls such as levers or buttons.

In order to simplify the gearshift operation by the user, technology has been used, for example, to store combinations of auxiliary transmission gears and main transmission gears previously used, so that when the auxiliary transmission gear is switched by the user, the main transmission is automatically set to a main transmission gear that was set when that auxiliary transmission gear was previously used. Examples of such technology are described in Japanese Laid-Open Patent Publication No. H10-44814 and Japanese Laid-Open Patent Publication No. 2005-9532, for example.

SUMMARY OF THE INVENTION

With such conventional technology as described above, when the user switches the auxiliary transmission gear, there is no guarantee that the main transmission gear desired by the user is set automatically. If the user wishes to set a main transmission gear that is different from the previously used gear, the user needs to manually switch the main transmission gear. Some users may wish to have a specific main transmission gear set automatically when the auxiliary transmission gear is switched. With the conventional technology, however, it is not possible to meet such demands.

Example embodiments of the present disclosure provide work vehicles each capable of solving such problems, and methods for controlling the same.

A work vehicle according to an example embodiment of the present disclosure includes a transmission to shift gears by switching between a plurality of main transmission gears and a plurality of auxiliary transmission gears, an input interface for a user to set a value of the main transmission gear corresponding to at least one of the auxiliary transmission gears, a storage to store a correspondence between the auxiliary transmission gear and the value, and a controller configured or programmed to, when the auxiliary transmission gear is switched, set the main transmission gear to the value corresponding to the switched auxiliary transmission gear based on the correspondence.

General or specific aspects of example embodiments of the present disclosure may be implemented using a device, a system, a method, an integrated circuit, a computer program, a non-transitory computer-readable storage medium, or any combination thereof. The computer-readable storage medium may be inclusive of a volatile storage medium or a non-volatile storage medium. The device may include a plurality of devices. In the case where the device includes two or more devices, the two or more devices may be included within a single apparatus, or divided over two or more separate apparatuses.

According to example embodiments of the present disclosure, when the auxiliary transmission gear is switched, the main transmission gear is automatically switched to a desired gear that is preset by the user, and it is therefore possible to simplify the gearshift operation.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
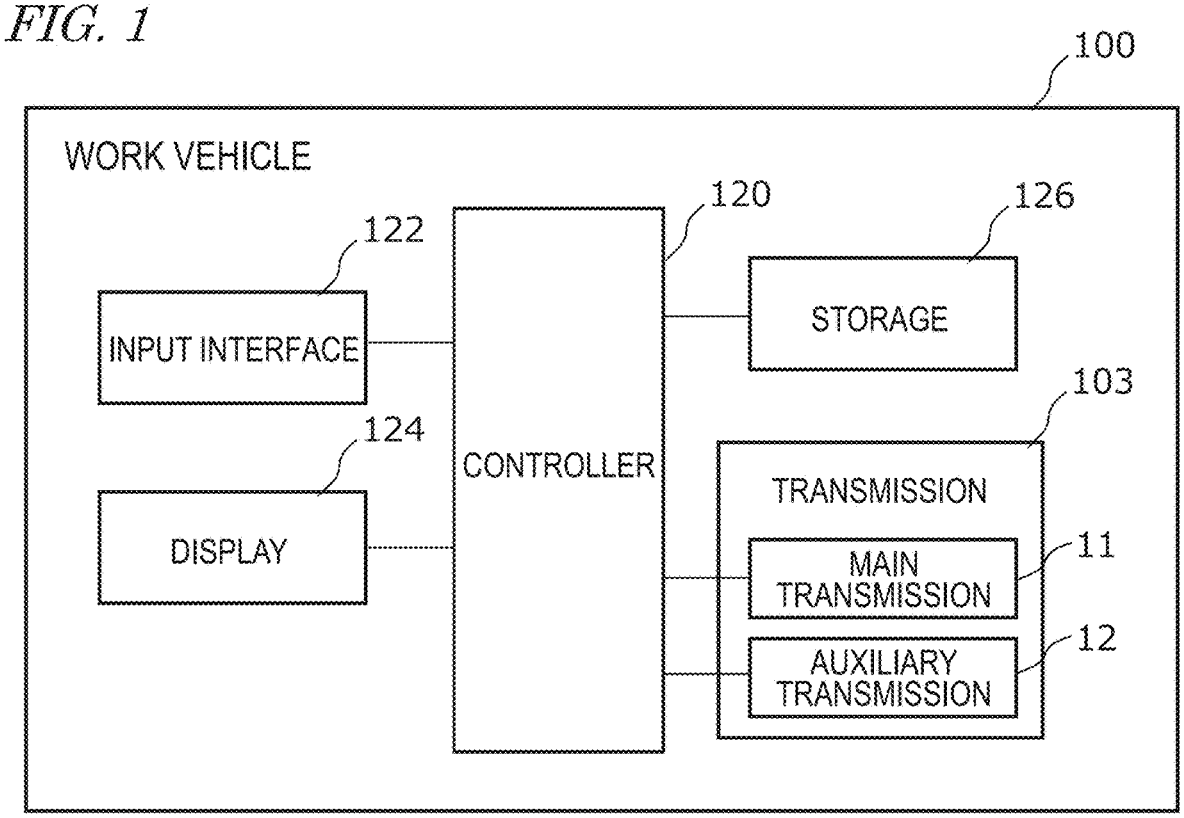
FIG. 1 is a block diagram showing a general configuration of a work vehicle.

Hereinafter, example embodiments of the present disclosure will be described. Note however that unnecessarily detailed descriptions may be omitted. For example, detailed descriptions on what is well known in the art or redundant descriptions on what is substantially the same configuration may be omitted. This is to prevent the following description from being unnecessarily redundant, and to facilitate the understanding of those skilled in the art. The accompanying drawings and the following description, which are provided by the present inventors so that those skilled in the art can sufficiently understand the present disclosure, are not intended to limit the scope of the claims. In the following description, elements or features having identical or similar functions are denoted by identical reference numerals.

The following example embodiments are only exemplary, and the technology of the present disclosure is not limited to the following example embodiments. For example, numerical values, shapes, steps, orders of steps, layout of a display screen, etc., which are indicated in the following example embodiments are only exemplary, and admit of various modifications so long as they do not cause technical inconsistency. Any one implementation may be combined with another so long as it does not cause technical inconsistency.

Before describing a specific example embodiment of the present disclosure, the basic configuration and operation of an example embodiment of the present disclosure will be described.

FIG. 1 is a block diagram showing a general configuration of a work vehicle 100 according to an example embodiment of the present disclosure. The work vehicle 100 of the present example embodiment includes a transmission 103 to shift gears by switching between a plurality of main transmission gears and a plurality of auxiliary transmission gears. The work vehicle 100 further includes an input interface 122 for the user to set the value of the main transmission gear corresponding to at least one of the auxiliary transmission gears, a storage 126 that stores the correspondence between the values of the auxiliary transmission gear and the main transmission gear, and a controller 120 that controls the transmission 103. When the auxiliary transmission gear is switched, the controller 120 sets the main transmission gear to the value corresponding to the switched auxiliary transmission gear based on the correspondence stored in the storage 126. As shown in FIG. 1, the work vehicle 100 can also include a display 124. The display 124, for example, displays a setting screen for the user to set the value of the main transmission gear corresponding to each auxiliary transmission gear.

The transmission 103 may include a main transmission 11 and an auxiliary transmission 12. The main transmission 11 and the auxiliary transmission 12 are each configured to be capable of shifting through a plurality of gears. For example, the main transmission 11 may be configured to be capable of shifting through 4, 6, 8, 10, or more gears. The auxiliary transmission 12 may be configured to be capable of shifting through 2 gears (low and high), 3 gears (low, medium, and high), 4 gears (creep, low, medium, and high, etc.), or more gears. The gears to which the main transmission 11 can be shifted are referred to as "main transmission gears" and the gears to which the auxiliary transmission 12 can be shifted are referred to as "auxiliary transmission gears". The total number of gears of the main transmission gears and the total number of gears of the auxiliary transmission gears can be arbitrarily designed. The total number of main transmission gears may be 4 or more and 12 or less, for example. The total number of auxiliary transmission gears may be 2 or more and 6 or less, for example.

The input interface 122 is a device used by the user to set the value of the corresponding main transmission gear for each of or some of the plurality of auxiliary transmission gears. The display 124 is a device used to display a setting screen for the user to set the value of the corresponding main transmission gear for each of or some of the auxiliary transmission gears. The input interface 122 and the display 124 may be separate devices or may be realized by a single device. For example, an operating terminal such as a meter panel unit including an input interface, or a tablet or a smartphone having a touch screen may function as the input interface 122 and the display 124.

The controller 120 is a device that controls the operation of the work vehicle 100. The controller 120 can be realized by a computer including one or more processors, such as an electronic control unit (ECU), provided in the work vehicle 100. The controller 120 may be realized by a single ECU or by a plurality of ECUs. The controller 120 is configured or programmed to determine the correspondence between the auxiliary transmission gears and the main transmission gears based on information input by the user via the input interface 122, and to store the correspondence in the storage 126.

The storage 126 is a device including any storage medium, such as, for example, a semiconductor storage medium, a magnetic storage medium or an optical storage medium. The storage 126 may be a collection of storage devices. The storage 126 may be a device independent of the controller 120, or it may be included in the controller 120. For example, if the ECU functions as the controller 120, the memory in the ECU may function as the storage 126. The storage 126 may be configured or programmed to store computer programs executed by the controller 120 and various information generated by the controller 120.

Figure 2:
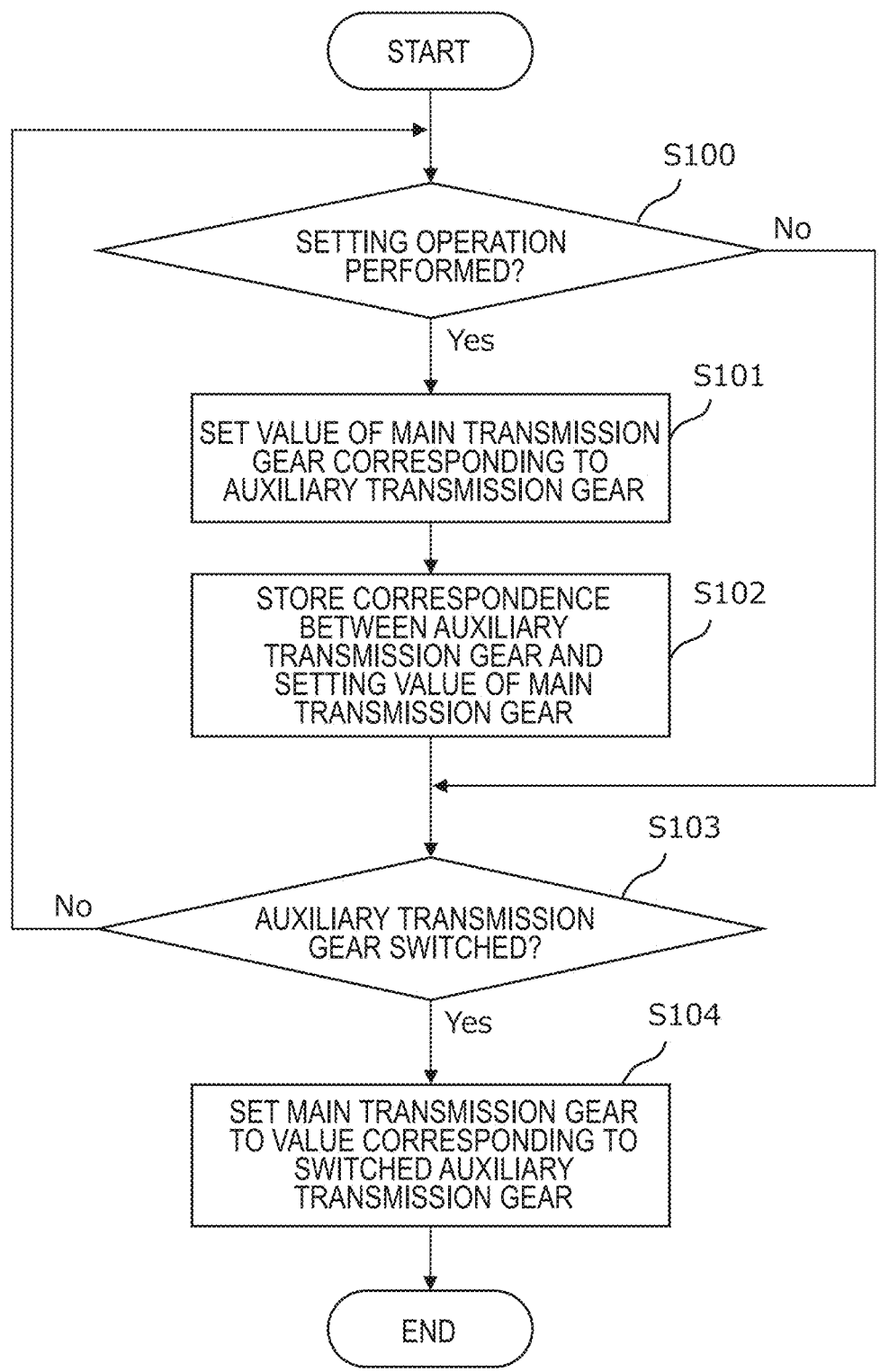
FIG. 2 is a flow chart showing an example of a control method.

FIG. 2 is a flow chart showing an example of a control method executed by the controller 120. The controller 120 executes the operation shown in FIG. 2 by executing a program stored in the storage 126.

In step S100, the controller 120 determines whether a gearshift function setting operation has been performed. The setting operation is performed by the user using the input interface 122 based on the setting screen displayed on the display unit 124, for example. The setting screen is a screen usable to set the value of the corresponding main transmission gear for each auxiliary transmission gear. When the user performs the setting operation, the process proceeds to step S101. When the user does not perform the setting operation, the process proceeds to S103.

Figure 3:
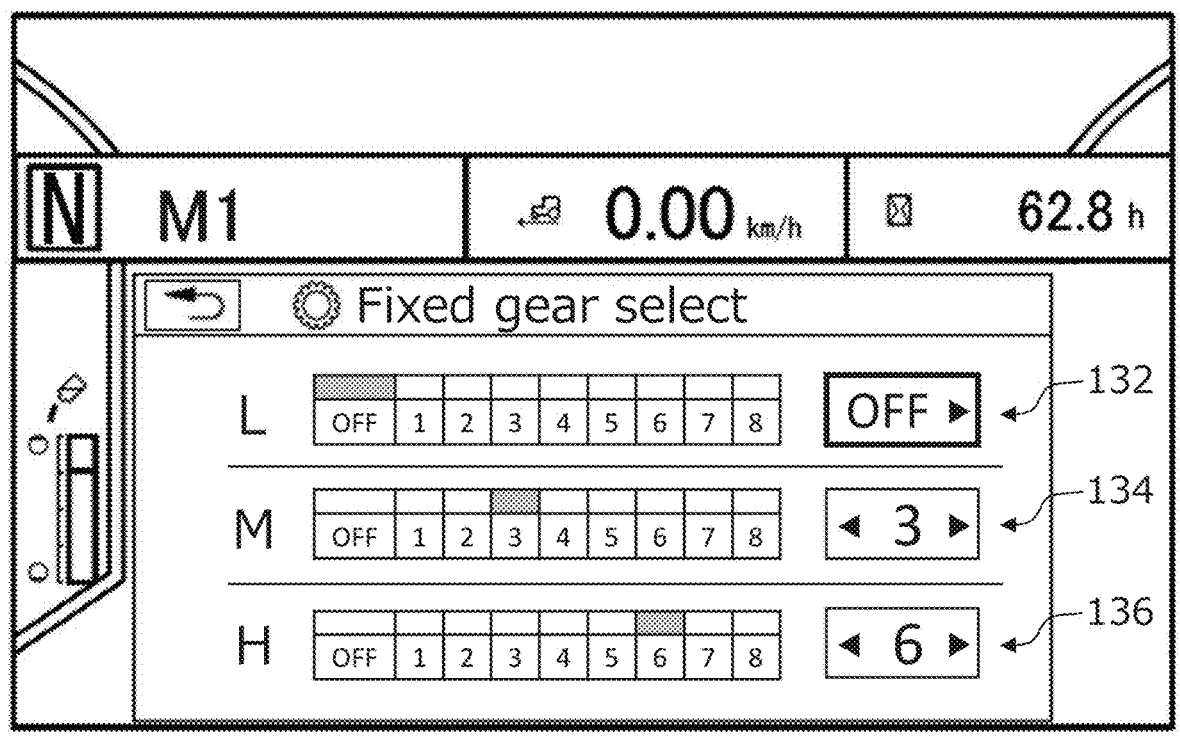
FIG. 3 is a view showing an example of a setting screen.

FIG. 3 is a view showing an example of the setting screen displayed on the display 124. In this example, three gears of low (L), medium (M) and high (H) are available for the auxiliary transmission, and eight transmission gears of 1 to 8 are available for the main transmission. The display 124 in this example is a display of a meter panel unit provided in the driver's seat, and also displays information such as vehicle speed. The setting screen shown in FIG. 3 includes areas 132, 134 and 136 for setting the value of the main transmission gear corresponding to each of the three auxiliary transmission gears of L, M and H. In the illustrated example, it is possible for the user not to set a value of the main transmission gear corresponding to each of the auxiliary transmission gears, in which case the user specifies "OFF". For example, a value of the main transmission gear that is predetermined by the system (e.g., 1 or the value of the main transmission gear used immediately before) is associated with the auxiliary transmission gear for which "OFF" is specified. As an example, FIG. 3 shows an example where "OFF" is specified for the L gear of the auxiliary transmission, "3" is specified for the M gear of the auxiliary transmission, and "6" is specified for the H gear of the auxiliary transmission. The user can change the values in the areas 132, 134, and 136 using the input interface 122 to thereby reflect the settings. As described above, the display 124 may show, for each of the auxiliary transmission gears, a display indicating that the user is allowed to select whether to set the value of the corresponding main transmission gear for each of the auxiliary transmission gears.

In the example shown in FIG. 3, a graphical user interface (GUI) that visually displays the setting value of the main transmission gear for each of the auxiliary transmission gears is displayed as the setting screen. Such a GUI allows the user to easily set the value of the main transmission gear corresponding to each of the auxiliary transmission gears.

When the setting operation is completed, the process proceeds to step S101. In step S101, the controller 120 sets the value of the main transmission gear corresponding to each of the auxiliary transmission gears specified by the user. In the subsequent step S102, the controller 120 stores the correspondence between the auxiliary transmission gears and the setting values of the main transmission gears in the storage 126. For example, for each of the gears L, M and H of the auxiliary transmission, data such as a table representing the corresponding value of the main transmission gear or indicating that the corresponding value of the main transmission gear has not been set ("OFF" described above) is stored in the storage 126. Thereafter, when the auxiliary transmission gear is switched, the controller 120 automatically sets the main transmission gear based on the correspondence stored in the storage 126.

In step S103, the controller 120 determines whether the auxiliary transmission gear has been switched. The controller 120 can determine whether the auxiliary transmission gear has been switched, for example, based on a signal from a sensor attached to a lever to switch the auxiliary transmission gear. If the auxiliary transmission gear has been switched, the process proceeds to S104. If the auxiliary transmission gear has not been switched, the process returns to step S100.

In step S104, the controller 120 sets the main transmission gear to a value corresponding to the switched auxiliary transmission gear based on the correspondence stored in step S102. For example, as shown in FIG. 3, if the value of the main transmission gear corresponding to the M gear of the auxiliary transmission is "3" and the auxiliary transmission gear is switched from the L gear or the H gear to the M gear, the controller 120 sets the main transmission gear to "3". If the main transmission gear immediately before switching the auxiliary transmission gear is different from "3", the main transmission gear is switched to "3", and if the main transmission gear immediately before switching the auxiliary transmission gear is "3", the main transmission gear is maintained at "3".

With such control, when the user switches the auxiliary transmission gear, the main transmission gear is automatically set according to the correspondence between the auxiliary transmission gear and the main transmission gear preset by the user. Thus, for a user who often sets to a specific main transmission gear for a specific auxiliary transmission gear, for example, it is possible to reduce the time and effort required to switch the main transmission gear and improve convenience.

In the present example embodiment, the correspondence between the values of the auxiliary transmission gears and the main transmission gears once stored is not erased even after the work vehicle 100 is stopped (e.g., engine off). Therefore, even if the auxiliary transmission gear is switched to a specific gear after the work vehicle 100 is started (e.g., engine on) and while the vehicle is not running, if the value of the main transmission gear corresponding to that auxiliary transmission gear has been set, that main transmission gear will be set automatically. In other words, if the value of the main transmission gear corresponding to the auxiliary transmission gear is set before the work vehicle 100 is stopped and the auxiliary transmission gear is switched after the work vehicle 100 is started, the controller 120 sets the main transmission gear to the value that is set before the work vehicle 100 is stopped, corresponding to the switched auxiliary transmission gear. Thus, it is possible to appropriately set a combination between an auxiliary transmission gear and a main transmission gear according to the preference of the user, even immediately after the work vehicle 100 is started.

The advantageous effects of the present example embodiment will now be described in more detail in contrast to the conventional technology.

Figure 4:
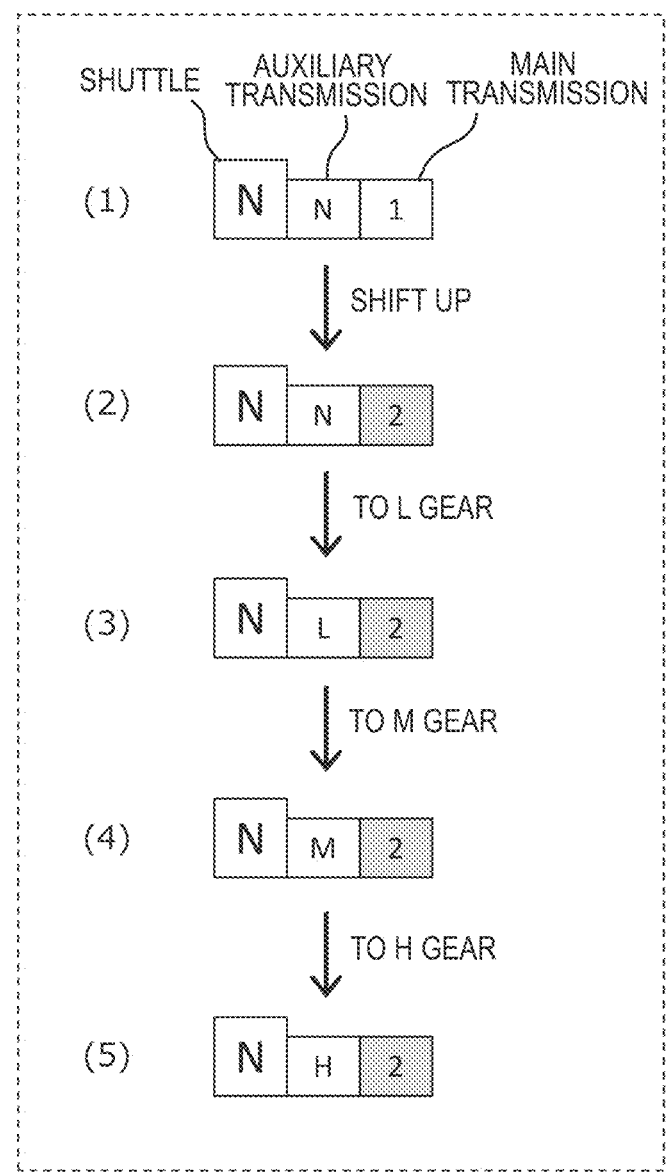
FIG. 4 is a view showing an example of a conventional gearshift control.

FIG. 4 is a view showing an example of a conventional gearshift control. FIG. 4 shows an example transition of the combination between the shuttle lever, the auxiliary transmission gear and the main transmission gear. Here, the shuttle lever is a lever to switch between forward and reverse of the work vehicle, and has three states of forward (F), neutral (N) and reverse (R). The auxiliary transmission gear is switched by the shift lever, for example, and takes four states of N (neutral), L (low), M (medium) and H (high). The main transmission gear is switched by the shift-up button and the shift-down button provided on the shift lever, for example, and is set to one of eight values from 1 to 8.

In the example shown in FIG. 4, after the work vehicle is started (e.g., after the engine is started), the main transmission is set to "1" as shown in (1) of FIG. 4. At startup, the shuttle lever and the auxiliary transmission are in the "N" state. When the user performs a shift up or shift down operation in this state, the value of the main transmission is increased or decreased. For example, (2) of FIG. 4 shows the main transmission having been increased to "2" by shifting up. Even if the user switches the auxiliary transmission from "N" to "L" in this state, the main transmission is maintained at "2" before being switched as shown in (3) of FIG. 4. Even if the auxiliary transmission is switched to "M" or "H", the value of the main transmission does not change unless the user voluntarily performs an operation of shifting up or shifting down ((4) and (5) of FIG. 4).

Thus, in the example shown in FIG. 4, the value of the main transmission gear is not automatically changed when the auxiliary transmission gear is switched. Therefore, if the value of the main transmission gear after the auxiliary transmission gear is switched is different from the value desired by the user, the user needs to perform an operation to change the value of the main transmission gear.

Figure 5:
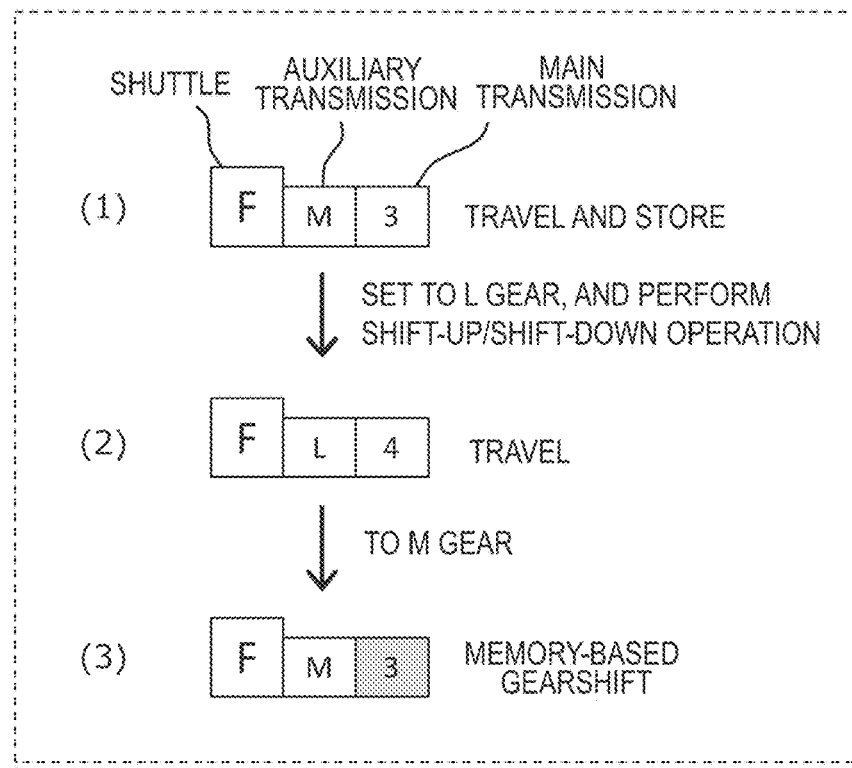
FIG. 5 is a view showing another example of a conventional gearshift control.

FIG. 5 is a view showing another example of a conventional gearshift control. In this example, during operation of the work vehicle, a combination of values of the auxiliary transmission and the main transmission is stored in the memory, and when the auxiliary transmission gear is switched, the main transmission is automatically set to a stored value of the main transmission gear. For example, consider the case where the work vehicle travels with the auxiliary transmission set to "M" and the main transmission set to "3" as shown in (1) of FIG. 5. The combination of values of the auxiliary transmission and the main transmission at this time is stored in the memory. In this state, suppose that the user switches the auxiliary transmission from "M" to "L" and performs a shift-up or shift-down operation to the state shown in (2) of FIG. 5. If the work vehicle travels in this state and the user switches the auxiliary transmission from "L" to "M", the main transmission gear is automatically switched to the previously stored value of "3" as shown in (3) of FIG. 5.

Thus, in the example of FIG. 5, when the auxiliary transmission is switched, if the previously set main transmission value is stored, the main transmission is automatically set to that value. This function is referred to as "memory-based gearshift" in the present specification. The memory is a volatile memory, and the stored value is erased when the work vehicle 100 is stopped (i.e., when the engine is turned off or when the power is turned off).

In the example of FIG. 5, the memory-based gearshift is performed when the auxiliary transmission is switched from "L" to "M", but the memory-based gearshift can be similarly performed also when the auxiliary transmission is switched from "M" to "L", from "M" to "H" and from "H" to "M". Note however that when the auxiliary transmission is switched from "M" to "H", if the main transmission gear corresponding to "H" used immediately before is 4 or higher, for example, a control may be performed to limit the main transmission gear to 3 or less, for example, in order to prevent sudden acceleration.

Figure 6:
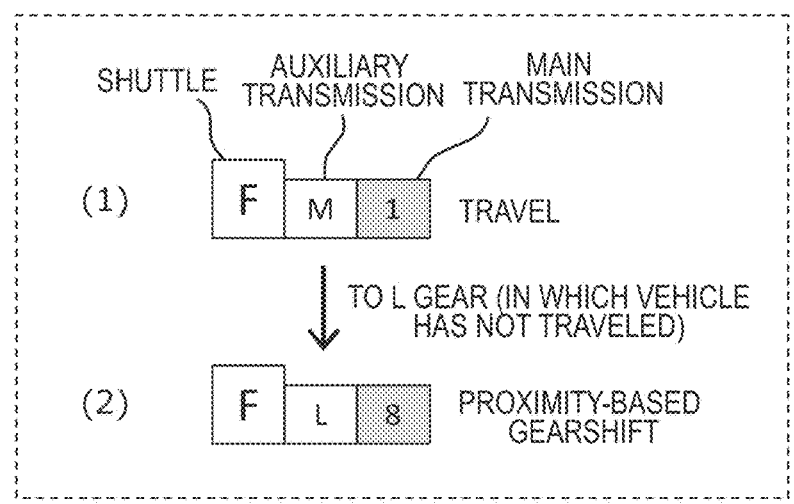
FIG. 6 is a view showing still another example of a conventional gearshift control.

FIG. 6 is a view showing still another example of a conventional gearshift control. In this example, when the auxiliary transmission gear is switched, the main transmission is automatically set to a main transmission gear such that the reduction ratio is closest to the reduction ratio before switching. The reduction ratio is the ratio of the number of revolutions after the gearshift to the number of revolutions of the engine. The "number of revolutions" means the number of revolutions per unit time (e.g., one minute). For example, consider the case where the work vehicle is traveling with the auxiliary transmission set to "M" and the main transmission set to "1" as shown in (1) of FIG. 6, and then the auxiliary transmission is switched to "L", which has not been selected for traveling after the startup of the work vehicle, as shown in (2). In this case, the main transmission gear is switched to "8", which is the value where the reduction ratio is closest to the immediately preceding reduction ratio. As another example, when the auxiliary transmission is switched to "H" from a state where the auxiliary transmission is set to "M" and the main transmission is set to "5", the main transmission is switched to "1", which is the value where the reduction ratio is closest to the immediately preceding reduction ratio. With such a control, it is possible to reduce the change in the reduction ratio after switching the auxiliary transmission, thereby facilitating smooth starting. This function is referred to as "proximity-based gearshift" in the present specification. The proximity-based gearshift may be used in combination with the memory-based gearshift shown in FIG. 5. For example, the memory-based gearshift may be performed when the auxiliary transmission is switched to a gear that has been selected for traveling after the engine started, whereas the proximity-based gearshift may be performed when the auxiliary transmission is switched to a gear that has not been selected for traveling.

With the gearshift controls shown in FIG. 4 to FIG. 6, when the auxiliary transmission gear is switched, the main transmission gear is set to a value that is predetermined by the system or a value that is stored when that auxiliary transmission gear was used in the past, rather than a value that is desired by the user. Therefore, in order to change the combination of the auxiliary transmission gear and the main transmission gear to a combination that is desired by the user, it is necessary to perform an operation of shifting up or shifting down the main transmission. For example, a user who wants the main transmission to always be set to "5" when the auxiliary transmission is set to "H" may feel annoyed if the main transmission is automatically set to a value such as "1" when the auxiliary transmission is switched, because it is then necessary to perform a shift-up or shift-down operation. If the user wants to set the main transmission to a value other than "1" while the vehicle has not traveled after the engine is started, it is necessary to perform a shift-up operation.

According to the present example embodiment, for each auxiliary transmission gear, the user can set the desired main transmission gear value. Thus, it is possible to reduce the number of operations to switch the main transmission gear and improves convenience because when the auxiliary transmission gear is switched, the main transmission is automatically set to a main transmission gear that is desired by the user.

Figure 7:
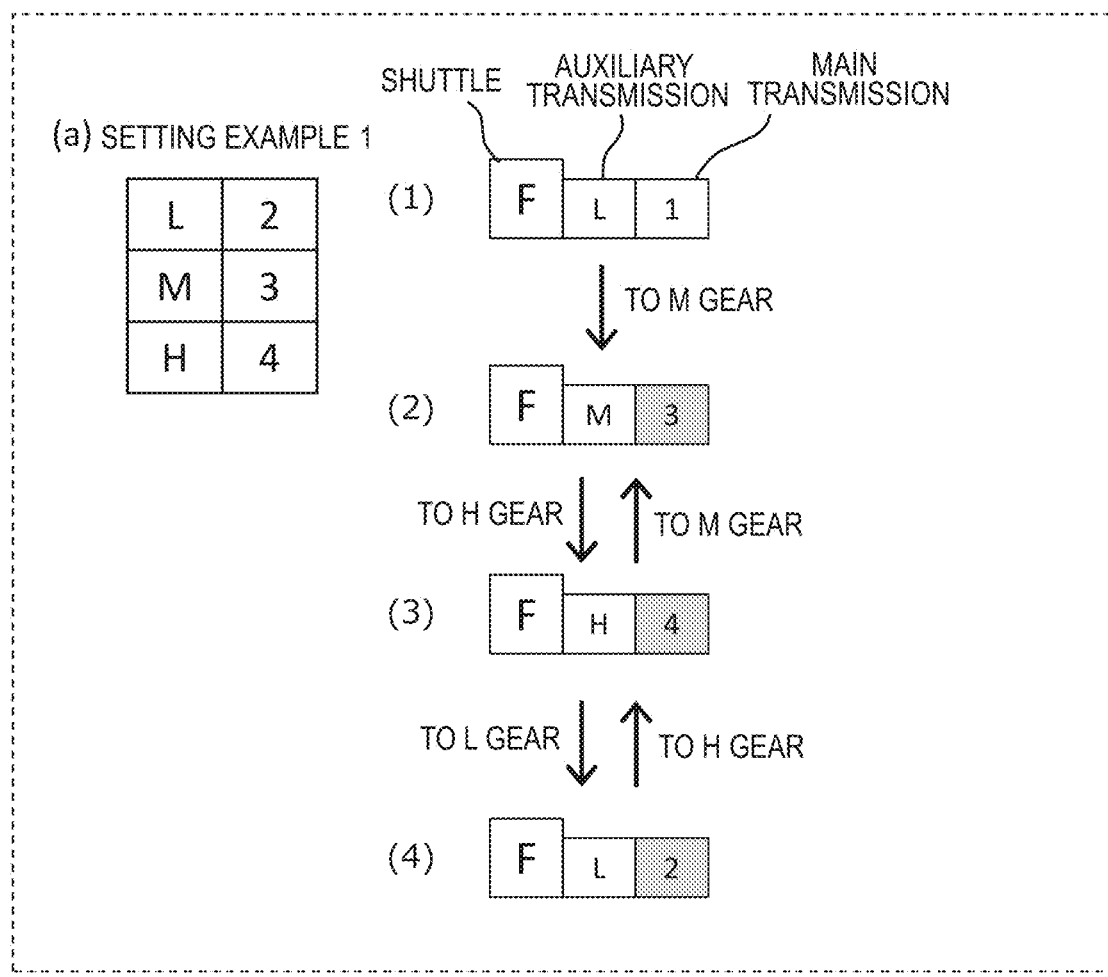
FIG. 7 is a view showing an example of a gearshift control according to an example embodiment of the present disclosure.

FIG. 7 is a view showing an example of a gearshift control according to the present example embodiment. In this example, as shown in (a) of FIG. 7, the user has set "2" as the value of the main transmission corresponding to the auxiliary transmission "L", "3" as the value of the main transmission corresponding to the auxiliary transmission "M", and "4" as the value of the main transmission corresponding to the auxiliary transmission "H". In this case, where the auxiliary transmission is set to "L" and the main transmission is set to "M" as shown in (1) of FIG. 7, if the auxiliary transmission is switched to "M", the main transmission is switched to "3" as shown in (2) of FIG. 7. When the auxiliary transmission is switched to "H", the main transmission is switched to "4" as shown in (3) of FIG. 7. Furthermore, when the auxiliary transmission is switched to "L", the main transmission is switched to "2" as shown in (4) of FIG. 7.

Figure 8:
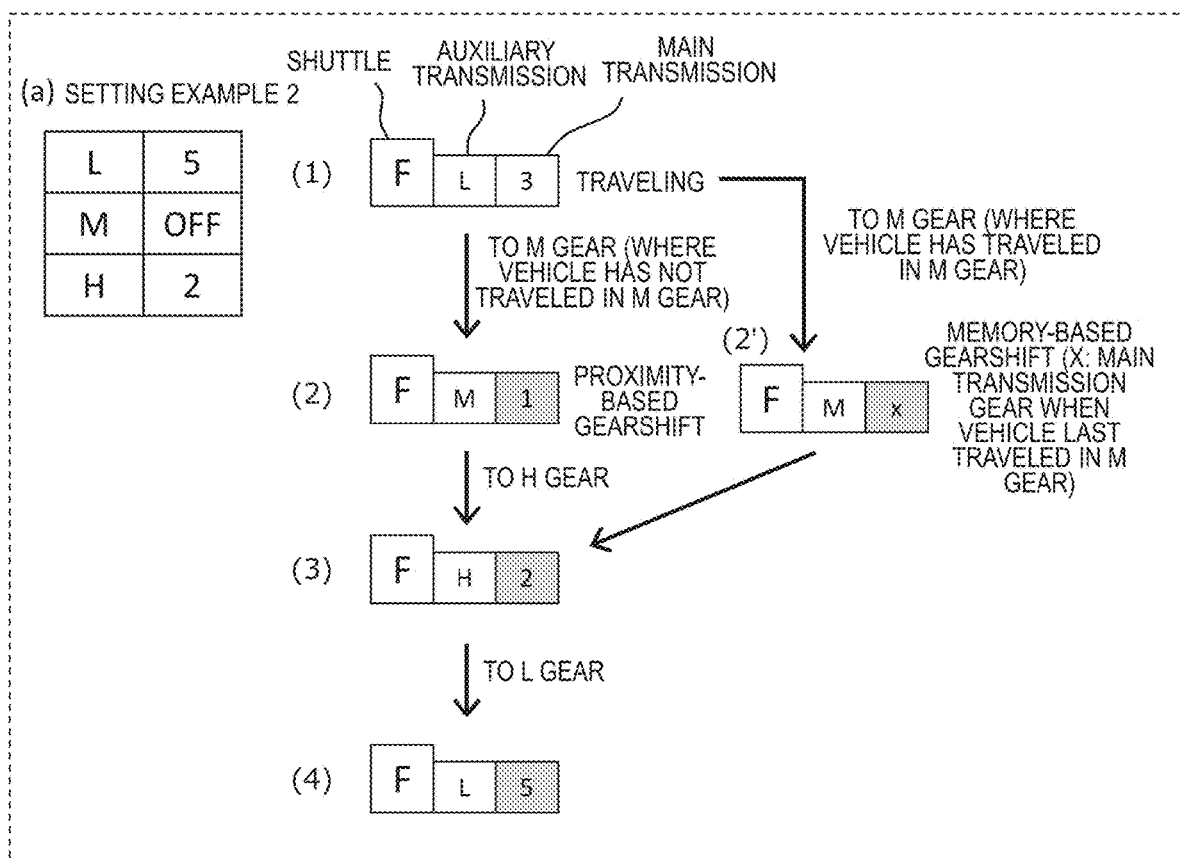
FIG. 8 is a view showing another example of a gearshift control according to an example embodiment of the present disclosure.

FIG. 8 is a view showing another example of a gearshift control according to the present example embodiment. In this example, as shown in (a) of FIG. 8, the user has set "5" as the value of the main transmission corresponding to the auxiliary transmission "L", no value ("OFF") of the main transmission corresponding to the auxiliary transmission "M", and "2" as the value of the main transmission corresponding to the auxiliary transmission "H". In this case, where the work vehicle travels with the auxiliary transmission set to "L" and the main transmission set to "3" as shown in (1) of FIG. 8, if the auxiliary transmission is switched to "M", the proximity-based gearshift or memory-based gearshift operation is performed as shown in (2) or (2') of FIG. 8. If the vehicle has not yet traveled with the auxiliary transmission set to "M" after the engine is started, the proximity-based gearshift is performed. With the proximity-based gearshift, the main transmission is set so as to realize a reduction ratio that is closest to the immediately preceding reduction ratio ("1" in the example of (2) of FIG. 8). If the vehicle has traveled with the auxiliary transmission set to "M" after the engine is started, the memory-based gearshift is performed. With the memory-based gearshift, the value of the main transmission gear used when traveling in the M gear immediately before (denoted as "x" in (2') of FIG. 8) is read out from the memory and the main transmission gear is set to that value. When the auxiliary transmission is switched to "H", the main transmission is switched to "2" as shown in (3) of FIG. 8. Furthermore, when the auxiliary transmission is switched to "L", the main transmission is switched to "5" as shown in (4) of FIG. 8.

Thus, in the present example embodiment, the user can set the value of the main transmission gear for each of the auxiliary transmission gears. When an auxiliary transmission gear is switched, the main transmission gear is set to a value corresponding to the switched auxiliary transmission gear. This gearshift control is also applied when the work vehicle first travels in the switched auxiliary transmission gear after the engine is started (i.e., after the work vehicle is started). Therefore, the setting of the main transmission gear for each auxiliary transmission gear is stored in a nonvolatile storage device.

If the setting of the main transmission gear corresponding to an auxiliary transmission gear is "OFF", a gearshift control similar to those shown in FIG. 4 to FIG. 6 can be performed for that auxiliary transmission gear. For example, if, after startup, the work vehicle 100 is already traveling in the auxiliary transmission gear for which "OFF" is set, then travels in another auxiliary transmission gear and is then switched back to the auxiliary transmission gear for which "OFF" is set, the main transmission gear is set to the value of the main transmission gear when the work vehicle traveled previously (memory-based gearshift). In order to realize this memory-based gearshift function, when the combination of the auxiliary transmission gear and the main transmission gear is changed, the storage 126 stores the changed combination. When the auxiliary transmission gear is switched to a gear for which the corresponding main transmission value has not been set, the controller 120 switches the main transmission gear to the value of the main transmission gear stored when the work vehicle 100 traveled previously in that auxiliary transmission gear.

If, after startup, the work vehicle 100 has never traveled in an auxiliary transmission gear for which "OFF" is set, then travels in another auxiliary transmission gear, and is then switched to the auxiliary transmission gear for which "OFF" is set, the main transmission gear is switched to a value such as to realize a reduction ratio closest to the reduction ratio before switching (i.e., a value such that the change in reduction ratio before and after the switch is smallest) (proximity-based gearshift). In other words, when the auxiliary transmission is switched to an auxiliary transmission gear that has not been used since the startup of the work vehicle 100 and the value of the main transmission gear corresponding to that auxiliary transmission gear has not been set, the controller 120 switches the main transmission gear to a main transmission gear such as to realize a reduction ratio closest to the reduction ratio before switching the auxiliary transmission gear.

With the operation described above, in addition to the effect that the user can freely set the main transmission gear for each auxiliary transmission gear, it is possible to apply a conventional gearshift control such as memory-based gearshift or proximity-based gearshift as the user wishes. This allows for an appropriate gearshift control according to the needs of the user.

An example embodiment in which the technologies of the present disclosure are applied to an agricultural tractor, which is an example of the work vehicle. The technologies of the present disclosure can be applied to any work vehicle, not limited to a tractor. The work vehicle may be, for example, a rice transplanter, a combine harvester, a mower, a harvester, a snow plow or a construction work vehicle.

Figure 9:
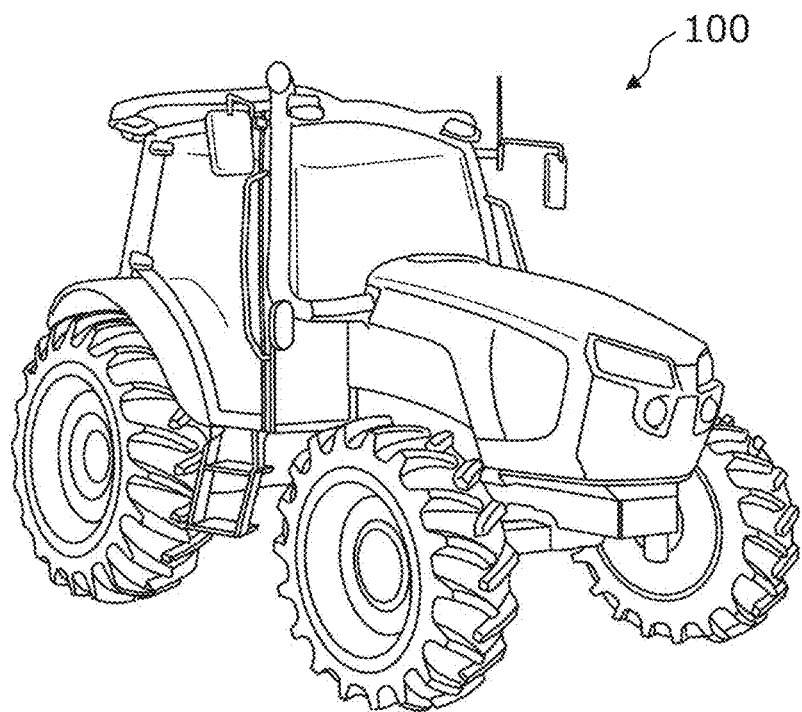
FIG. 9 is a perspective view showing an example of a work vehicle 100.
Figure 10:
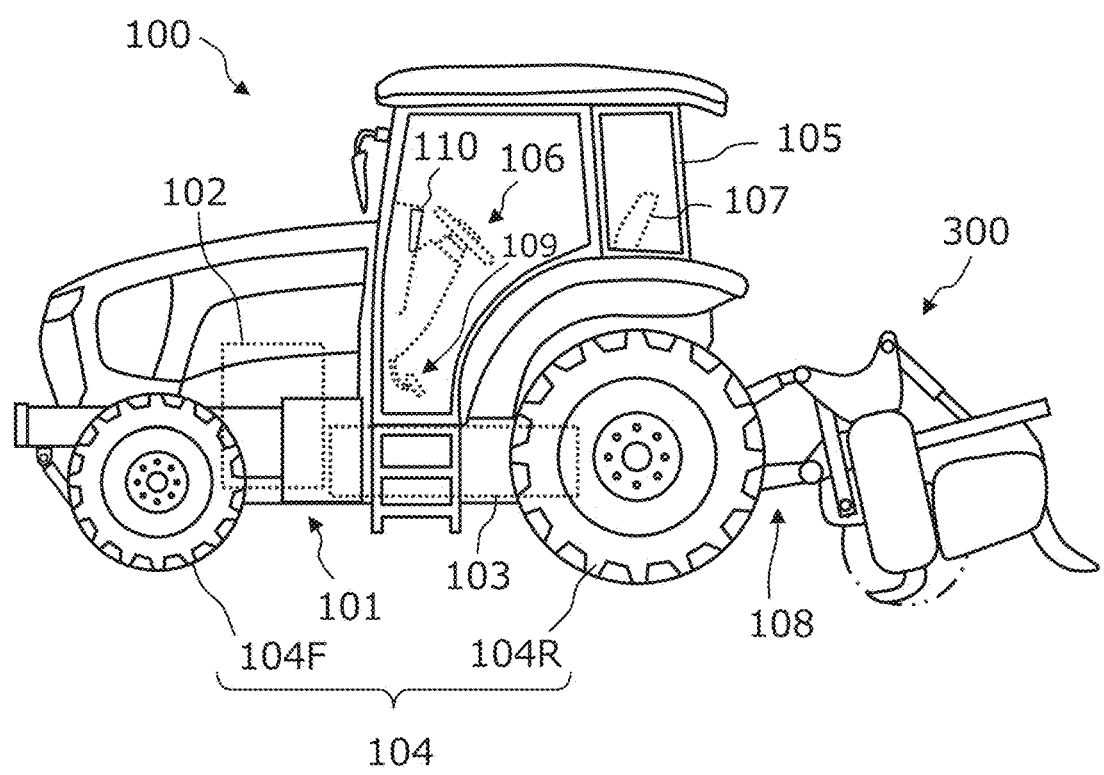
FIG. 10 is a side view schematically showing an example of a work vehicle and a work equipment.

FIG. 9 is a perspective view of an example of the work vehicle 100 in an example embodiment of the present disclosure. FIG. 10 is a side view schematically showing an example of the work vehicle 100 and a work equipment (implement) 300 connected to the work vehicle 100. The work vehicle 100 of the present example embodiment is a tractor used for agricultural work in agricultural fields (e.g., fields, orchards, paddy fields, etc.).

The work vehicle 100 shown in FIG. 10 includes a vehicle body 101, a prime mover (engine) 102, a transmission 103 and a traveling device 104. The vehicle body 101 is provided with a cabin 105. The traveling device 104 includes four wheels with tires (front wheels 104F and rear wheels 104R), an axle that rotates the four wheels, and a braking device (brake) that brakes the wheels. One or both of the front wheels 104F and the rear wheels 104R may be replaced by a plurality of wheels with an infinite track (crawlers) instead of wheels with tires.

Inside the cabin 105 is a driver's seat 107, a steering device 106, a plurality of pedals 109, a meter panel unit 110 and switches (controls) for operation.

The prime mover 102 may be, for example, a diesel engine. An electric motor may be used instead of a diesel engine. The transmission 103 can change the propulsion and the travel speed of the work vehicle 100 by shifting gears. The transmission 103 can also switch the work vehicle 100 between forward and reverse.

The steering device 106 includes a steering wheel, a steering shaft connected to the steering wheel, and a power steering device to assist steering with the steering wheel. The front wheels 104F are steering wheels, and by changing their steering angle, it is possible to change the direction in which the work vehicle 100 travels. The steering angle of the front wheels 104F can be changed by operating the steering wheel. The power steering system includes a hydraulic device or an electric motor that provides auxiliary power to change the steering angle of the front wheels 104F. The work vehicle 100 may include the automatic steering function. When automatic steering is performed, the steering angle of the front wheels 104F is automatically adjusted by the power of the hydraulic device or the electric motor under control from the control device arranged in the work vehicle 100.

The plurality of pedals 109 include an accelerator pedal, a clutch pedal and a brake pedal. Each pedal is provided with a sensor to detect the depression of the pedal.

A connecting device 108 is provided at the rear portion of the vehicle body 101. The connecting device 108 may include, for example, a three-point support device (also called a "three-point link" or "three-point hitch"), a PTO (Power Take Off) shaft, a universal joint and a communication cable. The connecting device 108 allows a work equipment 300 to be attached to and detached from the work vehicle 100. The connecting device 108 can, for example, raise and lower the three-point link by the hydraulic device to change the position or attitude of the work equipment 300. Power can be sent from the work vehicle 100 to a work equipment 300 via the universal joint. The work vehicle 100 can make the work equipment 300 perform a predetermined task while pulling the work equipment 300. The connecting device may be provided at the front of the vehicle body 101. In that case, the work equipment can be connected to the front of the work vehicle 100.

The work equipment 300 shown in FIG. 10 is a rotary cultivator, but the work equipment 300 is not limited to a rotary cultivator. For example, any work equipment such as a mower, a seeder, a spreader, a rake equipment, a baler, a harvester, a sprayer or a harrow can be connected to the work vehicle 100. The work vehicle 100 may be driven without the work equipment 300 attached.

Figure 11:
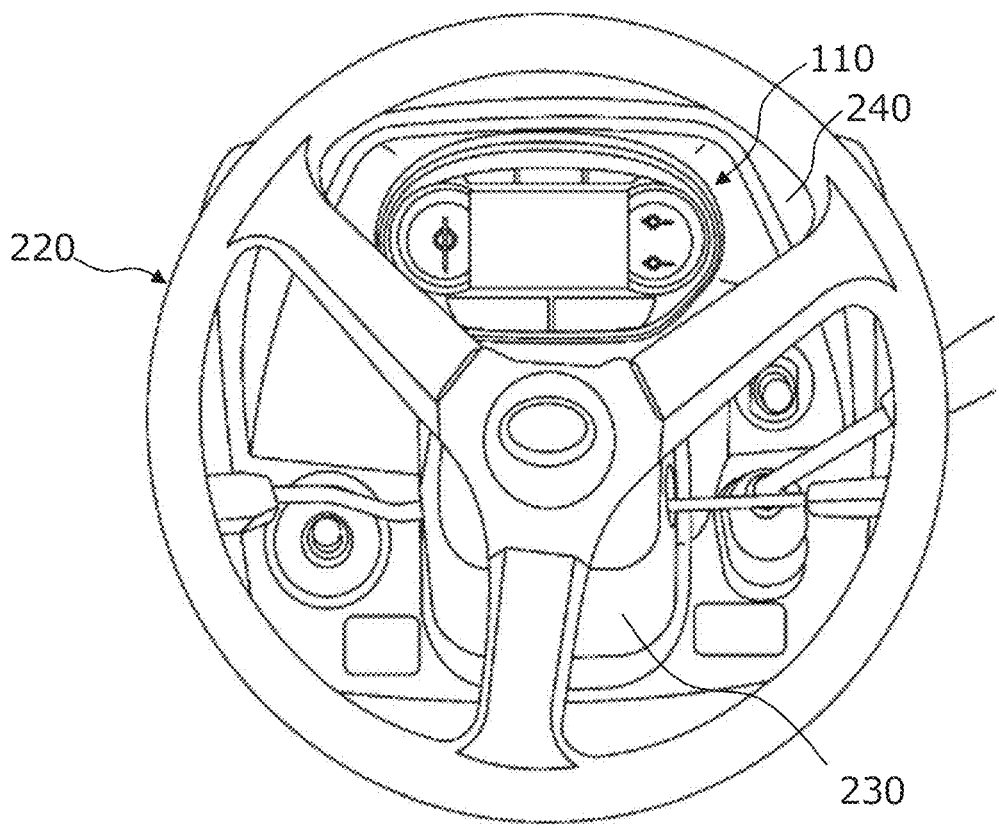
FIG. 11 is a front view schematically showing an example of a meter panel unit attached to a work vehicle.

FIG. 11 is a front view schematically showing an example of the meter panel unit 110 attached to the work vehicle 100. The meter panel unit 110 is an example of a display provided in the work vehicle 100. The meter panel unit 110 is configured to display the operating status of the work vehicle 100 and to display a setting screen for the user to make various settings related to the work vehicle 100. The meter panel unit 110 displays a setting screen usable to make settings related to the main transmission and the auxiliary transmission of the work vehicle 100, as shown in FIG. 3, for example. In the example shown in FIG. 11, the meter panel unit 110 is arranged on the front side of the driver's seat of the work vehicle 100. Specifically, the meter panel unit 110 is fitted into an opening of the meter cover 240 above a handle stay 230 that rotatably supports a steering wheel (handle) 220. The meter panel unit 110 is provided at a position that is visible from the driver seated in the driver's seat.

Figure 12:
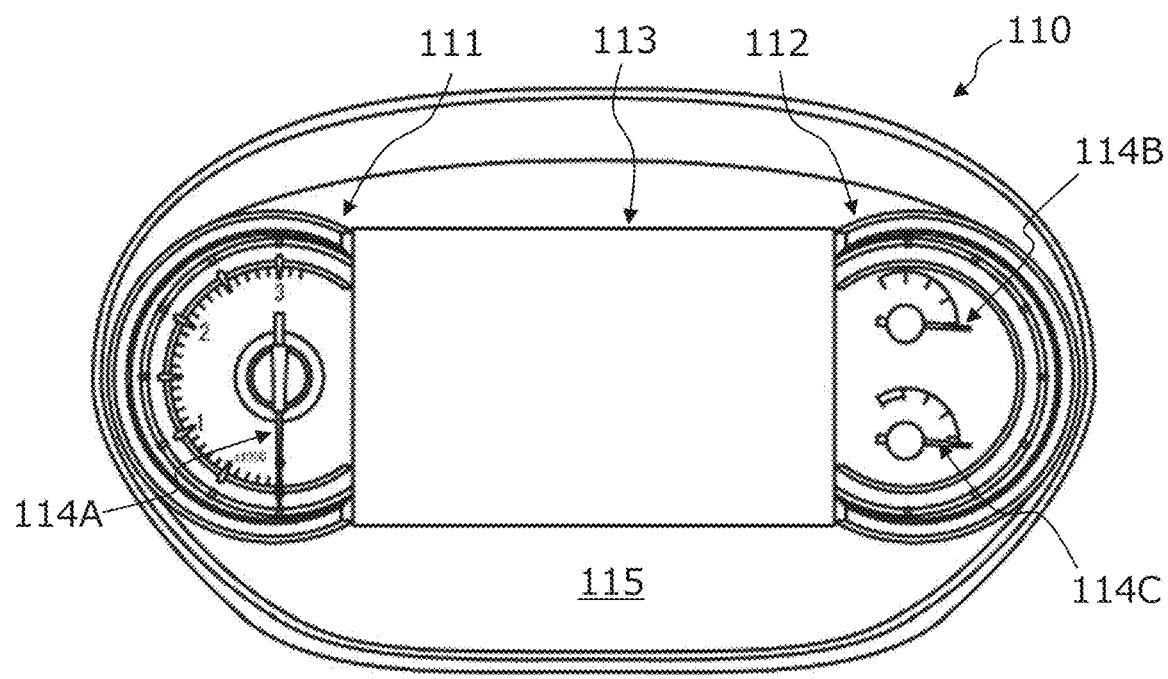
FIG. 12 is a front view showing an example of an arrangement of main component elements of a meter panel unit.

FIG. 12 is a front view showing an example of an arrangement of main component elements of the meter panel unit 110. The meter panel unit 110 shown in FIG. 12 includes a first analog meter 111, a second analog meter 112 and a display 113. The display 113 is provided between the first analog meter 111 and the second analog meter 112.

The first analog meter 111 includes an indicator needle 114A. The second analog meter 112 includes indicator needles 114B and 114C. The indicator needle 114A indicates, for example, the engine speed, i.e., the number of revolutions of the engine per unit time (e.g., one minute), by the direction in which the tip of the indicator needle 114A is pointing. The indicator needle 114B indicates, for example, the amount of remaining fuel by the direction in which the tip of indicator needle 114B points. The indicator needle 114C indicates, for example, the temperature of the engine coolant (water temperature) by the direction in which the tip of indicator needle 114C points.

The display 113 shown in FIG. 12 is an active matrix display such as a liquid crystal display panel or an OLED (Organic Light Emitting Diode), for example. The display 113 includes a large number of pixels arranged two-dimensionally in the display area, and a display visible to the human eye is realized by light emitted from the large number of pixels. With the display 113 of the present example embodiment, each pixel includes RGB sub-pixels, and it is possible to display color images. Unlike analog meters, the display 113 can show numbers, letters, figures, icons, symbols, still images or moving images of any size at any position within the display area. In the present example embodiment, the display 113 functions as the display 124 shown in FIG. 1.

Figure 13:
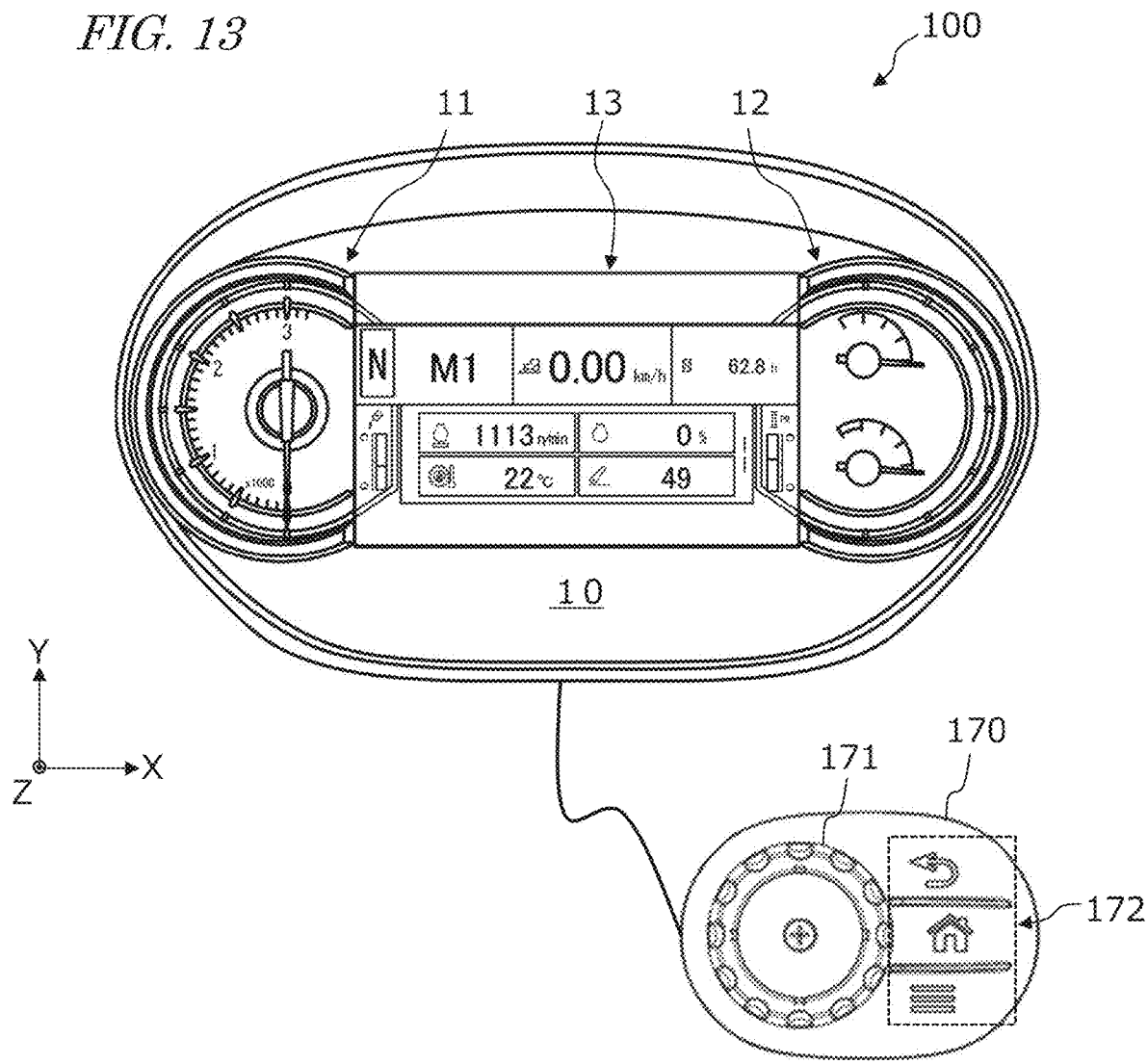
FIG. 13 is a view showing an example of a meter panel unit and an input interface.

FIG. 13 is a view showing an example of the meter panel unit 110 and an input interface 170 connected to the meter panel unit 110. The user can use the input interface 170 to change the display of content on the display area and to select various setting items. In the present example embodiment, the input interface 170 functions as the input interface 122 shown in FIG. 1.

In the example shown in FIG. 13, the input interface 170, which allows for an interactive operation by the user, is connected to the meter panel unit 110 via a communication cable. The input interface 170 includes a selector switch 171, such as a jog dial and an operation switch 172. The input interface 170 may be connected to the meter panel unit 110 in a wireless or wired connection. Alternatively, the input interface 170 may be connected to the control device of the work vehicle 100 and send input signals to the meter panel unit 110 via CAN (Controller Area Network) communication. Any device that accepts user operations may be used as the input interface 170. The input interface 170 may be, for example, a rotary switch, a slide switch, a pushbutton switch, a touch screen, a joystick, or a combination of two or more thereof.

Various images indicating information related to the work vehicle can be displayed on the display 113. Information related to the work vehicle may include, for example, information in conjunction with the internal combustion engine, the vehicle body, the PTO shaft, the hydraulic/three-point hitch, and electrical components of the vehicle body. These pieces of information indicate the internal state of the vehicle system. Information related to the vehicle body includes, for example, information related to the direction of travel of the vehicle, the clutch, the gearshift, the brake, the headland control and the cruise control. The display 113 also displays a setting screen as shown in FIG. 3. Moreover, the display 113 may also display various content including, for example, a camera image, a radio setting screen and an audio setting screen.

Figure 14:
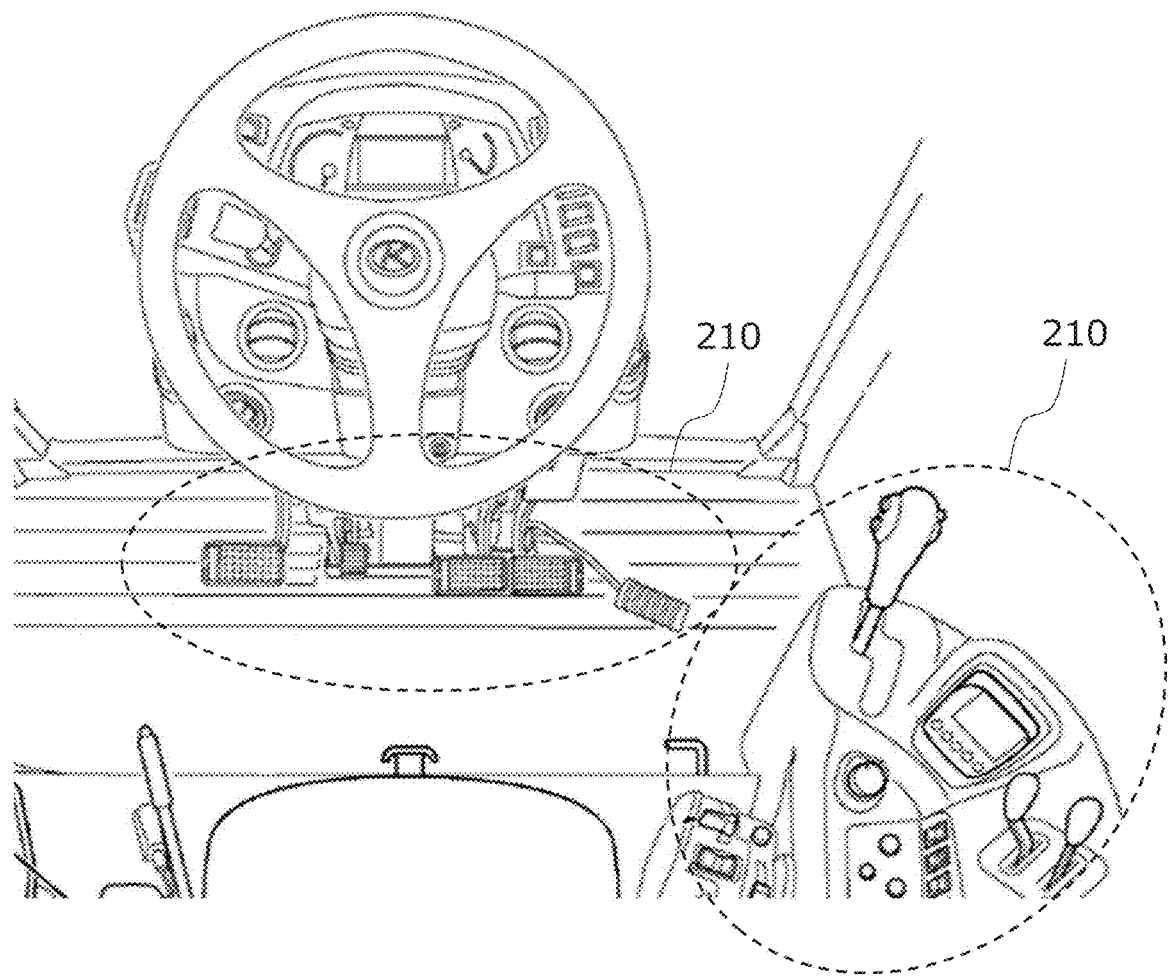
FIG. 14 is a view showing an example of operation switches provided inside the cabin.

FIG. 14 is a view showing an example of operation switches provided in the cabin 105. Operation switches 210 including a number of switches (including buttons, levers and pedals) that can be operated by the user are arranged inside the cabin 105. The operation switches 210 may include a switch (e.g., a button) to switch the main transmission gear, a switch (e.g., a shift lever) to switch the auxiliary transmission gear, and a switch (e.g., a shuttle lever) to switch between forward and reverse. The switches 210 also include pedals such as a clutch pedal, an accelerator pedal and a brake pedal. The switches 210 may also include the input interface 170 shown in FIG. 13.

Figure 15A:
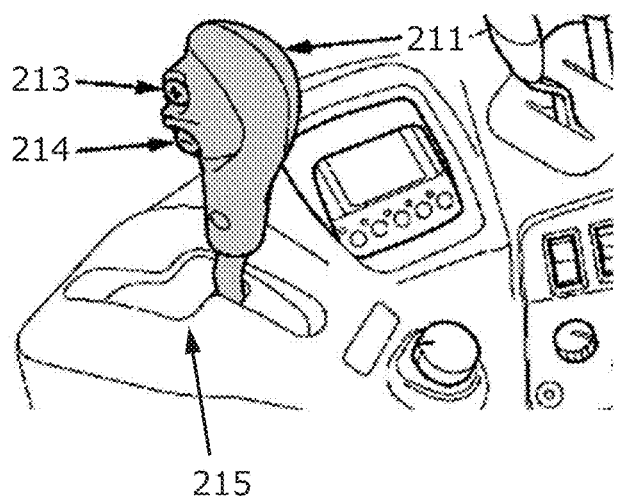
FIG. 15A is a perspective view showing a configuration of a shift lever.
Figure 15B:
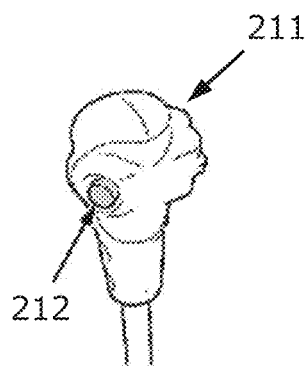
FIG. 15B is a view of the shift lever as viewed from a different side than FIG. 15A.
Figure 15C:
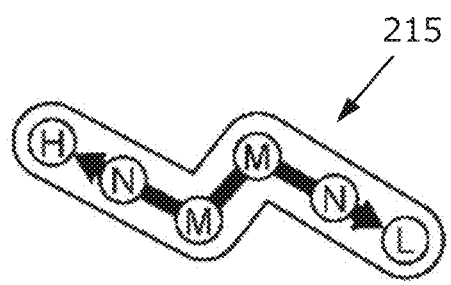
FIG. 15C is a view illustrating auxiliary transmission gears that are switched by operating the shift lever.

FIGS. 15A to 15C are views for illustrating a shift lever 211 included in the operation switches 210. The shift lever 211 is used by the user to switch the main transmission gear and the auxiliary transmission gear. FIG. 15A is a perspective view showing the configuration of the shift lever 211. FIG. 15B is a view of the shift lever 211 as viewed from a different side than FIG. 15A. FIG. 15C is a view illustrating the auxiliary transmission gears that are switched by operating the shift lever 211. The shift lever 211 shown in these figures includes a clutch button 212, a shift-up button 213 and a shift-down button 214. The user can switch the auxiliary transmission gear by moving the shift lever 211. Switching the auxiliary transmission gear requires the user to press the clutch button 212, depress the clutch pedal or place the shuttle lever, which switches between forward and reverse, in neutral. The user can shift up the main transmission by one gear by pressing the shift-up button 213 and shift down the main transmission by one gear by pressing the shift-down button 214.

In the present example embodiment, as shown in FIG. 15C, there are three auxiliary transmission gears of low (L), medium (M) and high (H). When switching between L and M or when switching between M and H, the user once moves the shift lever 211 to the neutral (N) position before switching. Note that the total number of gears of the auxiliary transmission is not limited to 3, but may be 2 or 4 or more. The total number of gears of the auxiliary transmission is typically 2 or more and 6 or less, but is not limited to this range.

The total number of gears of the main transmission is 8, for example. In that case, the user can switch from the slowest 1st gear to the fastest 8th gear by pressing the shift-up button 213 or the shift-down button 214. The total number of gears of the main transmission is not limited to 8, but may be 7 or less or 9 or more. The total number of gears of the main transmission is typically 4 or more and 12 or less, but is not limited to this range.

Figure 16:
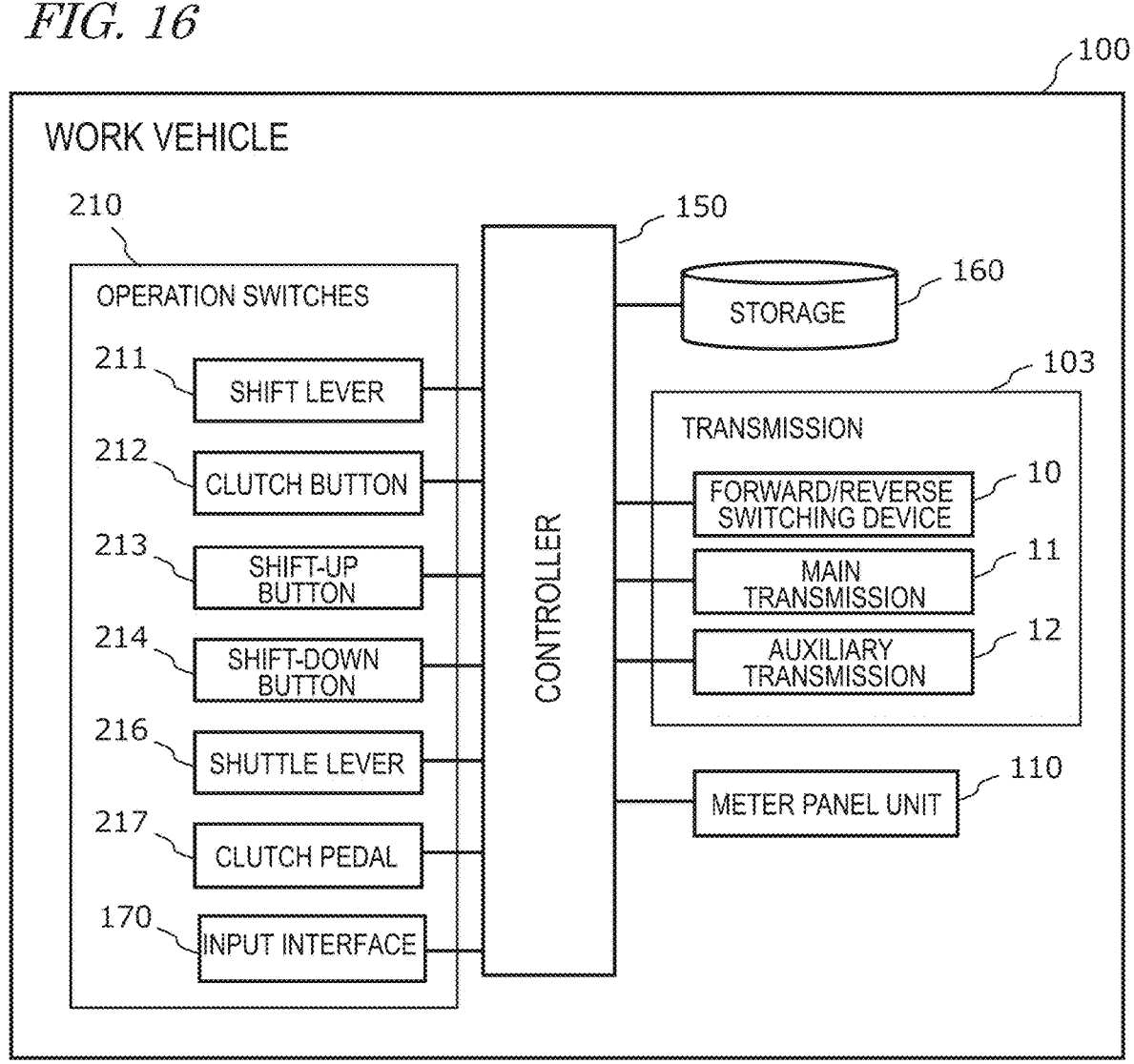
FIG. 16 is a block diagram showing component elements related to gearshift control of a work vehicle.

FIG. 16 is a block diagram showing component elements related to gearshift control of the work vehicle 100. The work vehicle 100 shown in FIG. 16 includes the operation switches 210, a control device 150, a storage device 160, a transmission 103, the meter panel unit 110 and the input interface 170.

The operation switches 210 include a plurality of controls used by the user to operate the work vehicle 100. The controls include, for example, the shift lever 211, the clutch button 212, the shift-up button 213, the shift-down button 214, a shuttle lever 216, a clutch pedal 217 and the input interface 170. Note that the input interface 170 may be connected to the meter panel unit 110.

The control device 150 is an on-board computer that controls the operation of the work vehicle 100. The control device 150 may be realized by one or more electronic control units (ECUs). The control device 150 may include, for example, an ECU that controls the transmission 103 and an ECU that controls the meter panel unit 110. Each ECU includes one or more processors and one or more memories. When the control device 150 is realized by a plurality of ECUs, the ECUs can communicate with each other in accordance with a vehicle bus standard, such as CAN, for example. The control device 150 functions as the controller 120 shown in FIG. 1.

The storage device 160 includes one or more storage media, such as a flash memory or a magnetic disk. The storage device 160 stores various data generated by the control device 150. The storage device 160 also stores computer programs that cause the control device 150 to perform various operations to be described below. Such computer programs may be provided to the work vehicle 100 via a storage medium (e.g., a semiconductor memory or an optical disc) or a telecommunication line (e.g., the Internet). Such computer programs may be sold as commercial software. Note that the memory included in the control device 150 may serve as the storage device 160. The storage device 160 functions as the storage 126 shown in FIG. 1.

The transmission 103 includes a forward/reverse switching device 10, the main transmission 11 and the auxiliary transmission 12. The forward/reverse switching device 10 switches the power from the prime mover 102 between power for forward travel and power for reverse travel. The main transmission 11 shifts the power from the forward/reverse switching device 10 through a plurality of gears (e.g., 8 gears). The auxiliary transmission 12 shifts the power from the main transmission 11 through a plurality of gears (e.g., 3 gears). A configuration example of the transmission 103 will now be described more specifically with reference to FIG. 17.

Figure 17:
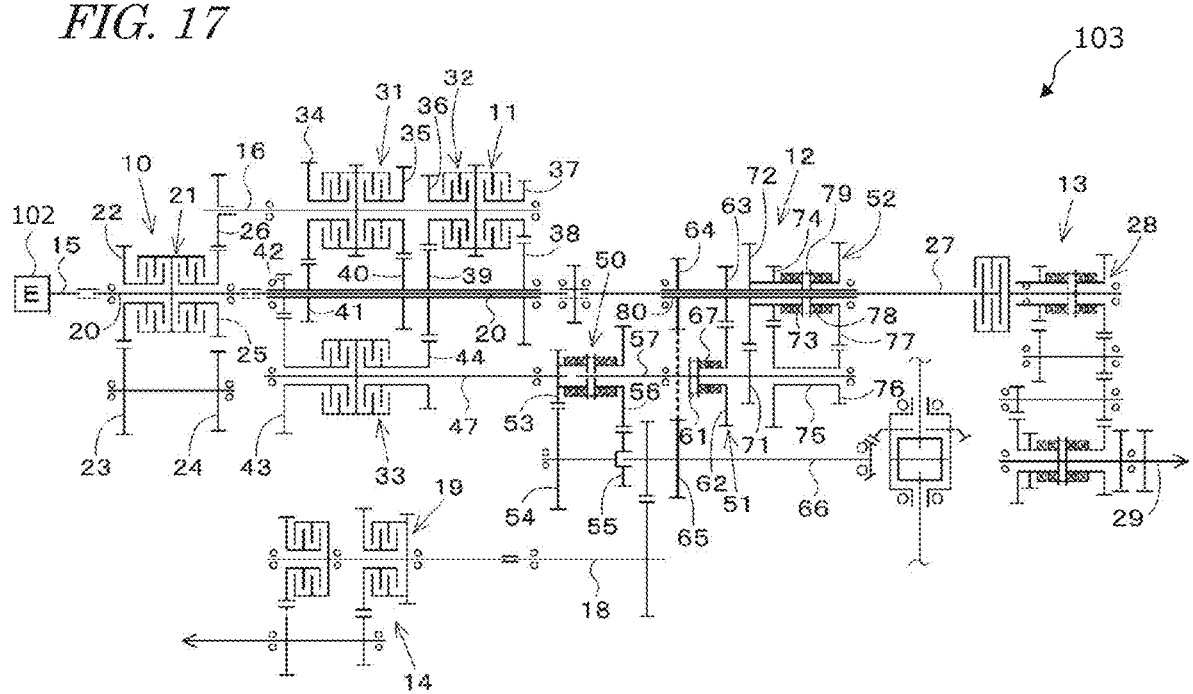
FIG. 17 is a view showing a more specific configuration example of a transmission.

FIG. 17 is a view showing a more specific configuration example of the transmission 103. The transmission 103 shown in FIG. 17 includes a PTO power transmission 13 and a front wheel power transmission 14, in addition to the forward/reverse switching device 10, the main transmission 11 and the auxiliary transmission 12.

The forward/reverse switching device 10 switches the power transmitted from a crankshaft 15 of the prime mover 102 to a propulsion shaft 16 of the traveling system. That is, the forward/reverse switching device 10 switches the direction of rotation of a propulsion shaft 16 to either forward or reverse. The forward/reverse switching device 10 includes a transmission shaft 20, a hydraulic clutch 21 and a plurality of gears 22, 23, 24, 25 and 26. The transmission shaft 20 rotates with the rotation of the crankshaft 15. The hydraulic clutch 21 is switched by hydraulic pressure between the forward side and the reverse side. When the hydraulic clutch 21 is switched to the forward side, the power of the transmission shaft 20 is transmitted to a propulsion shaft 16 via the gears 25 and 26. When hydraulic clutch 21 is switched to the reverse side, the power of the transmission shaft 20 is transmitted to a propulsion shaft 16 via the gears 22, 23, 24, 25 and 26.

The main transmission 11 includes a first main switch section 31, a second main switch section 32, a third main switch section 33 and a plurality of gears 34 to 44. The sizes of the gears 34 to 44 are different, which allows the power transmitted via the propulsion shaft 16 to be switched in a plurality of gears. The main transmission 11 is shifted in 4 gears via the gears 34 to 41 and in 2 gears via the gears 39 and 42 to 44. In other words, the main transmission 11 is capable of 8-speed gearshift.

The first main switch section 31, the second main switch section 32 and the third main switch section 33 are each a hydraulic clutch that can be switched between the first side and the second side. When the first main switch section 31 is switched to the first side, the power of the propulsion shaft 16 is transmitted via the gears 34 and 41 to the gear 43, which meshes with the gear 42, and the gear 44, which meshes with the gear 39. When the first main switch section 31 is switched to the second side, the power of the propulsion shaft 16 is transmitted to the gear 43 via the gears 35, 40 and 42 and transmitted to the gear 44 via the gears 35, 40 and 39.

When the second main switch section 32 is switched to the first side, the power of the propulsion shaft 16 is transmitted to the gear 44 via the gears 36 and 39 and transmitted to the gear 43 via the gears 36, 39 and 42. When the second main switch section 32 is switched to the second side, the power of the propulsion shaft 16 is transmitted to the gear 43 via the gears 37, 38 and 42 and transmitted to the gear 44 via the gears 37, 38 and 39.

When the third main switch section 33 is switched to the first side, the power transmitted to the gear 43 is transmitted to a transmission shaft 47. When the third main switch section 33 is switched to the second side, the power transmitted to the gear 44 is transmitted to the transmission shaft 47.

The auxiliary transmission 12 includes a creep section 50, a first auxiliary switch section 51 and a second auxiliary switch section 52. The creep section 50 is connected to the transmission shaft 47 and is switched by a shifter between the first side and the second side. When the creep section 50 is switched to the first side, the power of the transmission shaft 47 is transmitted to a transmission shaft 57 via the shifter. When the creep section 50 is switched to the second side, the power of the transmission shaft 47 is transmitted to the transmission shaft 57 via gears 53 to 56. In other words, when the creep section 50 is switched to the first side, the power of the transmission shaft 47 is transmitted to the transmission shaft 57 without deceleration, and when the creep section 50 is switched to the second side, the power of the transmission shaft 47 is transmitted to the transmission shaft 57 while being decelerated by the gears 53 to 56.

The first auxiliary switch section 51 includes a shifter 61 and a gear 62. The shifter 61 can rotate together with the transmission shaft 57 and can also move in the axial direction. The gear 62 can rotate relative to the transmission shaft 57. The position of the shifter 61 is controlled by the control device 150 and can switch between the neutral position and the high speed position. When the shifter 61 is switched to the high speed position to mesh with the rotator 67, the power of the transmission shaft 57 is transmitted to an output shaft 66 via gears 62, 63, 64 and 65. Here, the gears 63 and 64 are provided so as to rotate together with the transmission shaft 80, and the gear 65 is provided so as to rotate together with the output shaft 66.

The second auxiliary switch section 52 includes gears 71, 72, 74, 76 and 77, rotators 73 and 78, a transmitter 75 and a shifter 79. The gear 71 is provided so as to rotate together with the transmission shaft 57. The gear 72 meshes with the gear 71. The rotator 73 rotates together with the gear 72. The gear 74 rotates together with the rotator 73. The transmitter 75 rotates relative to the transmission shaft 57 and rotates with the rotation of the gear 74. The gear 76 rotates together with the transmitter 75. The gear 77 meshes with the gear 76. The rotator 78 rotates with the rotation of the gear 77. The shifter 79 can rotate together with the transmission shaft 80 and can also move in the axial direction. The position of the shifter 79 is controlled by the control device 150 and can switch between the low speed position, the neutral position and the medium speed position.

When the shifter 79 is switched from the neutral position to the low speed position and the shifter 79 meshes with the rotator 73, the power of the transmission shaft 57 is transmitted to the transmission shaft 80 via the gears 71 and 72 and the shifter 79. When the shifter 79 is switched from the neutral position to the medium speed position and the shifter 79 meshes with the rotator 78, the power of the transmission shaft 57 is transmitted to the transmission shaft 80 via the gears 71 and 72, the rotator 73, the gear 74, the transmitter 75, the gears 76 and 77, the rotator 78 and the shifter 79.

With such a configuration, the auxiliary transmission 12 can switch between three gears of the high speed gear (H), the middle speed gear (M) and the low speed gear (L). When the auxiliary transmission 12 is switched to the high speed gear (H), the control device 150 switches the shifter 61 to the high speed position and switches the shifter 79 to the neutral position. When the auxiliary transmission 12 is switched to the medium speed gear (M), the control device 150 switches the shifter 61 to the neutral position and switches the shifter 79 to the medium speed position. When the auxiliary transmission 12 is switched to the low speed gear (L), the control device 150 switches the shifter 61 to the neutral position and switches the shifter 79 to the low speed position. The shifters 61 and 79 are moved using a hydraulic system that includes a plurality of electromagnetic valves. The switched power is transmitted to the rear wheel differential device 82 which rotates the rear wheels via the output shaft 66.

The PTO power transmission 13 includes a PTO rotary shaft 27 to which the power of the transmission shaft 20 is transmitted and a switching mechanism 28 that switches the power of the PTO rotary shaft 27. With the PTO power transmission 13, the power from the prime mover 102 is transmitted to a PTO shaft 29 via the PTO rotary shaft 27 and the switching mechanism 28.

The front wheel power transmission 14 includes a transmission shaft 18 to which the power of the output shaft 66 is transmitted via a gear, and a switching mechanism 19. The power switched by the switching mechanism 19 is transmitted to the front wheels 104F.

The control device 150 of the present example embodiment displays a setting screen as shown in FIG. 3, for example, on the display 113 of the meter panel unit 110. On the setting screen, the user uses the input interface 170 to perform an operation of setting the value of the main transmission gear corresponding to each auxiliary transmission gear. Based on this operation, the control device 150 generates information (e.g., a table) representing the correspondence between the values of the auxiliary transmission gears and the main transmission gears, and stores the information in the storage device 160. This operation can be performed, for example, when the work vehicle 100 is not traveling. The storage device 160 is a nonvolatile storage device, and the stored information is not deleted even after the work vehicle 100 is stopped (i.e., after the engine is turned off or after the power is turned off).

Thereafter, when the user operates the shift lever 211 to switch the auxiliary transmission gear, the control device 150 sets the main transmission gear to the value corresponding to the switched auxiliary transmission gear based on the stored correspondence. Thus, when the auxiliary transmission gear is switched by an operation of the user using a control, the control device 150 sets the main transmission gear to the value corresponding to the switched auxiliary transmission gear. The control device 150 can detect that the auxiliary transmission gear has been switched from one particular gear to another based on a signal from a sensor provided in the shift lever 211, for example. More specifically, the control device 150 controls the transmission 103 in the manner described above with reference to FIG. 2, FIG. 7 and FIG. 8. By applying such control, it is possible to simplify the gearshift operation by the user and significantly improve the convenience.

Note that while it is assumed in the present example embodiment that the user (driver) drives the work vehicle 100, the work vehicle 100 may have a self-driving or automatic gearshift control function. Also where self-driving or automatic gearshift control is performed, the main transmission gear may be set automatically when the auxiliary transmission gear is switched based on the value of the main transmission gear for each auxiliary transmission gear set by the user in advance.

A control system including the control device (controller) and the storage device (storage) of the example embodiment described above may be installed later on the work vehicle. Such a system may be manufactured and sold independently of the work vehicle. The computer program used in such a system may also be manufactured and sold independently of the work vehicle. The computer program may be provided, for example, stored on a computer-readable, non-transitory storage medium. The computer program may also be provided by downloading via a telecommunication line (e.g., the Internet).

The technologies of example embodiments of the present disclosure are applicable to work vehicles such as agricultural tractors, harvesters or transplanters, for example. The technologies of example embodiments of the present disclosure are not limited to agricultural applications, but can also be applied to work vehicles used in other applications.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
   a transmission to shift gears by switching between a plurality of main transmission gears and a plurality of auxiliary transmission gears;

a display to present a graphical user interface including a setting screen for a user to set a value of a main transmission gear corresponding to each of the auxiliary transmission gears;

a storage to store a correspondence between each of the auxiliary transmission gears and the value of the corresponding main transmission gear; and a controller configured or programmed to, when an auxiliary transmission gear is switched, set a main transmission gear to the value corresponding to the switched auxiliary transmission gear based on the correspondence.

2. The work vehicle according to claim 1, wherein the storage is a non-volatile storage, and the controller is configured or programmed to, when values corresponding to the auxiliary transmission gears are set before the work vehicle is powered off, and after the work vehicle is powered on, when an auxiliary transmission gear is switched, set the main transmission gear to a value that was set before the work vehicle was powered off and corresponds to the switched auxiliary transmission gear.

3. The work vehicle according to claim 1, wherein the setting screen allows selection of whether to set the value for each of the auxiliary transmission gears.

4. The work vehicle according to claim 3, wherein
the storage is configured to, when a combination of the auxiliary transmission gear and the main transmission gear is changed, store the changed combination; and
the controller is configured or programmed to, when the auxiliary transmission gear is switched to another auxiliary transmission gear for which the value has not been set, switch the main transmission gear to a value of the main transmission gear stored when the work vehicle traveled previously in the another auxiliary transmission gear.

5. The work vehicle according to claim 3, wherein the controller is configured or programmed to, when the auxiliary transmission gear is switched to another auxiliary transmission gear that has not been used since the work vehicle is powered on and when a value of the main transmission gear corresponding to the another auxiliary transmission gear is not set, switch the main transmission gear to a main transmission gear such as to realize a reduction ratio closest to that before the auxiliary transmission gear is switched to the another auxiliary transmission gear.

6. The work vehicle according to claim 1, further comprising a control to be operated by the user; wherein
the controller is configured or programmed to, when the auxiliary transmission gear is switched by an operation of the user using the control, set the main transmission gear to the value corresponding to the switched auxiliary transmission gear.

7. The work vehicle according to claim 1, wherein
a total number of the main transmission gears is 4 or more and 12 or less; and
a total number of the auxiliary transmission gears is 2 or more and 6 or less.

8. A method performed by a computer for controlling a work vehicle including a transmission to shift gears by switching between a plurality of main transmission gears and a plurality of auxiliary transmission gears, the method comprising:
in response to an operation by a user using a graphical user interface including a setting screen presented on a display, setting a value of a main transmission gear corresponding to each of the auxiliary transmission gears;
storing a correspondence between each of the auxiliary transmission gears and the value of the corresponding main transmission gear in a storage; and
when an auxiliary transmission gear is switched, setting a main transmission gear to the value corresponding to the switched auxiliary transmission gear.

9. A non-transitory computer-readable medium including a computer program executable to control a work vehicle including a transmission to shift gears by switching between a plurality of main transmission gears and a plurality of auxiliary transmission gears, the computer program causing a computer to execute:
in response to an operation by a user using a graphical user interface including a setting screen presented on a display, setting a value of a main transmission gear corresponding to each of the auxiliary transmission gears;
storing a correspondence between each of the auxiliary transmission gears and the value of the corresponding main transmission gear in a storage; and
when an auxiliary transmission gear is switched, setting a main transmission gear to the value corresponding to the switched auxiliary transmission gear.

* * * * *